(12) United States Patent
Yoshihara et al.

(10) Patent No.: US 7,439,696 B2
(45) Date of Patent: Oct. 21, 2008

(54) ROTATING ELECTRIC MACHINE AND MANUFACTURING METHOD THEREOF

(75) Inventors: Hiroyuki Yoshihara, Tokyo (JP); Masao Kikuchi, Tokyo (JP); Masaki Kato, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 60 days.

(21) Appl. No.: 11/606,954

(22) Filed: Dec. 1, 2006

(65) Prior Publication Data

US 2007/0139858 A1    Jun. 21, 2007

(30) Foreign Application Priority Data

Dec. 1, 2005    (JP)    ............................... 2005-347995

(51) Int. Cl.
*H02P 6/14* (2006.01)
(52) U.S. Cl. .................. 318/400.27; 318/716; 318/720; 290/38 R
(58) Field of Classification Search ............ 318/400.27, 318/716, 720; 290/38 R
See application file for complete search history.

(56) References Cited

U.S. PATENT DOCUMENTS

| | | | |
|---|---|---|---|
| 5,719,487 A * | 2/1998 | Sato et al. ...................... | 322/28 |
| 6,272,015 B1 * | 8/2001 | Mangtani ..................... | 361/707 |
| 6,734,551 B2 * | 5/2004 | Yoshihara et al. ............ | 257/706 |
| 6,977,475 B2 * | 12/2005 | Kuribayashi et al. ......... | 318/140 |
| 7,291,954 B2 | 11/2007 | Kashihara et al. | |

FOREIGN PATENT DOCUMENTS

| | | |
|---|---|---|
| JP | 02-272791 A | 11/1990 |
| JP | 2003-322082 A | 11/2003 |
| JP | 2004-254359 A | 9/2004 |
| JP | 2004-274876 A | 9/2004 |
| WO | 2005107040 A1 | 11/2005 |

* cited by examiner

*Primary Examiner*—Rina I Duda
(74) *Attorney, Agent, or Firm*—Sughrue Mion, PLLC

(57) ABSTRACT

A control device of a rotating electric machine to which an inverter is integrally assembled is downsized, and manufacturing costs are reduced. An inverter for controlling outputs from the rotating electric machine is integrated with a rotating electric machine, and in which a control device forming an inverter is constructed of a switching element and a heat sink, a drain electrode terminal of the switching element is directly joined to the heat sink, and a source electrode terminal and gate electrode terminal of the switching element are joined to a metal pattern formed at a connection member.

8 Claims, 4 Drawing Sheets

US 7,439,696 B2

ROTATING ELECTRIC MACHINE AND MANUFACTURING METHOD THEREOF

BACKGROUND OF THE INVENTION

1. Field of the Invention

The present invention relates to a rotating electric machine to which an inverter is integrally assembled and, more particularly, to a rotating electric machine that contains therein a control device to be installed on electric vehicles, hybrid vehicles, and idle-stop vehicles. The invention also relates to a manufacturing method of the rotating electric machine.

2. Description of the Related Art

In conventional rotating electric machines to which an inverter is integrally assembled, there is the one in which switching elements are mounted on a metal board, being an aluminum substrate on which a metal pattern is formed via an insulating layer. Further, to make an electrical connection between the metal board and a control board, there is provided a connection member formed by enveloped casting of the metal pattern with resin. One of connection terminals of the connection member is connected to a land space of the metal board, and the other connection terminal is connected to a through hole of the control board. In addition, the metal board is fixed to a heat sink via grease. (See FIG. 1 of the Japanese Patent Publication (unexamined) No. 254359/2004)

In the conventional rotating electric machines, a metal pattern on the metal board is formed in a planar state, so that a large mounting area is required when including the area for, e.g., resist. Furthermore, there has to be provided a space for mounting parts on the metal board, and other space for soldering the connection terminals. Moreover, the metal board and the control board are connected via the terminals of the connection member, a connection work is complicated, and a space for connecting terminals and boards together is also needed. Thus, the entire device gets larger, as well as a problem exists in high manufacturing costs.

Particularly in the rotating electric machine to which an inverter is integrally assembled, to contain an inverter in the rotating electric machine, it is necessary to downsize a control device. A large number of parts or the mounting space comes to be a cause of preventing the downsizing.

Meanwhile, the control device of the rotating electric machine is located near an engine, and taking into consideration the heat generation of switching elements, the control device is operated under extremely high-temperature conditions. Therefore, a large amount of heat is transferred to an insulating layer on the metal board, and thus a problem exists in that the metal board and the insulating layer are separated.

In the conventional structures using an expensive metal board or grease, there has to be provided an insulating layer of the board having insulating properties or grease, resulting in larger manufacturing costs of the rotating electric machine.

SUMMARY OF THE INVENTION

The present invention has been to solve the problems as mentioned above, and has an object of downsizing a control device of a rotating electric machine to which an inverter is integrally assembled, as well as reducing manufacturing costs.

It is a further object of the invention to provide a rotating electric machine in which a heat sink having conductivity is used as a conductor, as well as wirings having different polarities can be insulated from each other in a simple structure.

To achieve the above-mentioned objects, a rotating electric machine according to the invention comprises a rotor that is fixed to a shaft, and includes a field winding, a stator that is disposed opposite to this rotor, and includes an armature winding, and a control device for controlling current flowing through the armature winding, and in which the control device is formed of switching elements and heat sinks to which these switching elements are joined, the switching elements include a planar base part and a lead terminal having a polarity different from that of this base part, the base part is directly joined to the heat sink, as well as the lead terminal is joined to a metal pattern formed at a connection member, and a surface of the heat sink, to which the base part is directly joined, and a top of the metal pattern are constructed to be substantially in the same plane.

According to the rotating electric machine of the invention, it is possible to downsize a control device, as well as to reduce manufacturing costs.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
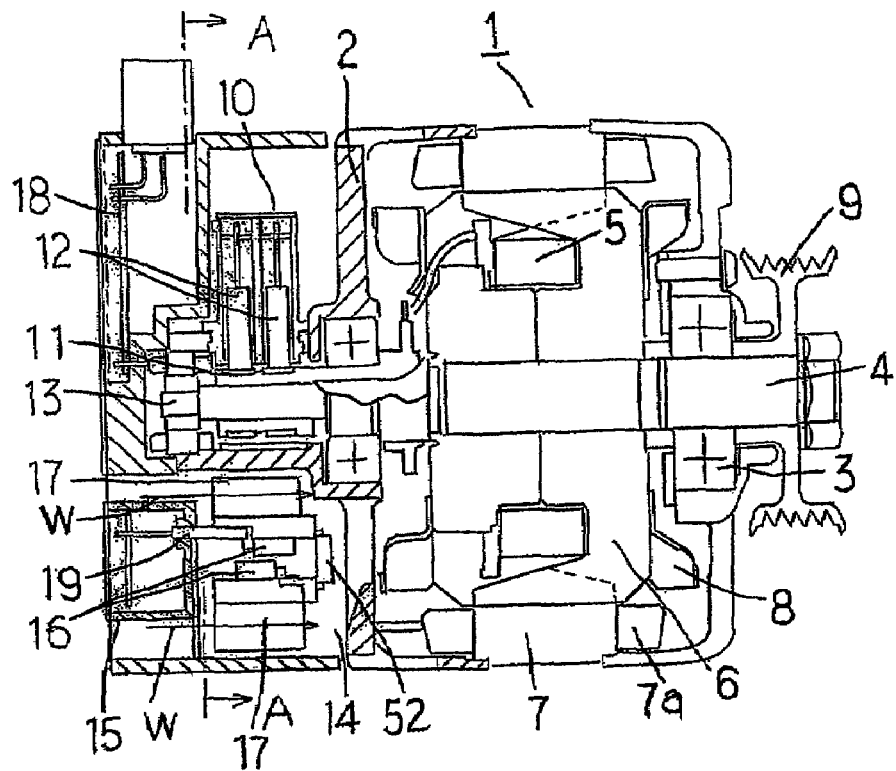
FIG. 1 is a sectional side view showing a rotating electric machine according to a first preferred embodiment of the present invention.

Several preferred embodiments of the present invention are hereinafter described referring to the drawings.

Embodiment 1

FIG. 1 is a sectional side view showing a rotating electric machine to which an inverter is integrally assembled according to a first embodiment of the invention.

With reference to the drawing, a rotating electric machine 1 is provided with a case formed of a front bracket (not shown) and a rear bracket 2; a shaft 4 rotatably supported via bearings 3 with respect to the case; a rotor 6 that is fixed to this shaft 4, and includes a field winding 5; a stator 7 that is fixed to the case, as well as disposed so as to surround the rotor 6, and further includes an armature winding 7*a*; fans 8 fixed to two end faces in the axial direction of the rotor 6; a pulley 9 fixed to an end portion of the front side of the shaft 4; a brush holder 10 attached to the rear bracket 2 so as to be located at the perimeter of the rear side of the shaft 4; a pair of slip rings 11 mounted onto the rear side of the shaft 4; a pair of brushes 12 disposed in the brush holder 10 so as to slide in contact with these slip rings 11; and a rotational position detection sensor (e.g. resolver) 13 disposed at the rear-side end portion of the shaft 4.

Furthermore, this rotating electric machine 1 is connected to a rotary shaft (not shown) of an engine via the pulley 9 and a belt (not shown).

A control device 14 is disposed inside a cover 15 that is located on the rear side of the rear bracket 2. The control device 14 is constructed of a plurality of switching elements 16 and heat sinks 17 connected to these switching elements 16. A control board 18 is connected to the switching elements 16 through a connection member 19. There are formed ventilation holes in the cover 15 and the rear bracket 2. By the rotation of the fans 8 located at the rotor 6, air as indicated by the arrow W flows through an internal part of the cover 15, to cool the switching elements 16, the heat sinks 17a to 17d, the control board 18, and the connection member 19.

Figure 2:
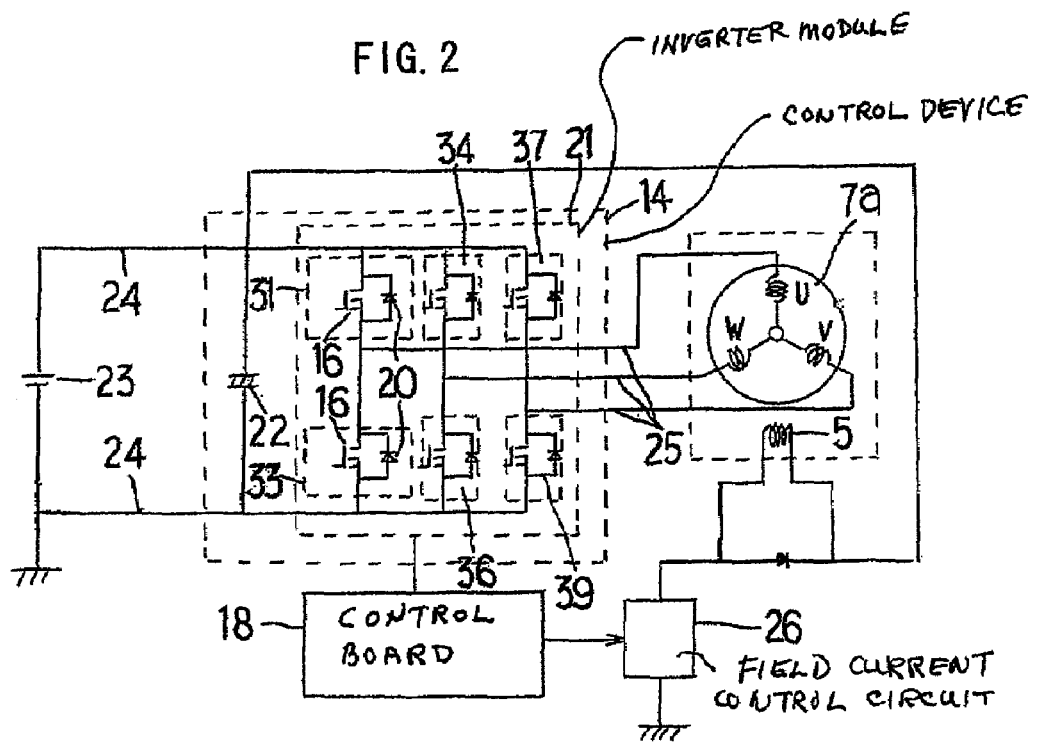
FIG. 2 is an electric circuit diagram in the rotating electric machine according to the first embodiment of the invention.

FIG. 2 is an electric circuit diagram in the rotating electric machine of the invention. The rotating electric machine 1 according to the invention is provided with the armature winding 7a of the stator 7 and the field winding 5 of the rotor 6. Further, the pulley 9 that is connected to the rotor 6 is connected to the rotary shaft of the engine via a belt. Herein, the armature winding 7a is constructed such that three phases of coils of U-phase, V-phase and W-phase are in Y-connection (star-connection).

The control device 14 is provided with an inverter module 21 that is formed of a plurality of switching elements 16 and diodes 20 connected in parallel with respect to each of the switching elements 16; and a capacitor 22 connected in parallel to this inverter module 21. In the inverter module 21, an upper arm is formed of the switching elements 16 and the diodes 20, and a lower arm is formed of the switching elements 16 and the diodes 20. These upper and lower arms are connected in series thus forming one set, and three sets thereof are located in parallel.

At start-up of the engine, a DC power is supplied to the control device 14 from a battery 23 via a DC wiring 24. Then, the control board 18 including a control circuit makes ON/OFF control of each of the switching elements 16 of the inverter module 21, and thus DC is converted to a three-phase AC. Then, this three-phase AC is supplied to the armature winding 7a of the stator 7 via an AC wiring 25.

Accordingly, a rotating magnetic field is generated around the field winding 5 of the rotor 6. Moreover, a field current is fed from a field current control circuit 26 to the field winding 5, so that the rotor 16 is driven to rotate. Then, the engine is started via the pulley 9, belt, crank pulley, and clutch.

In the meantime, after the engine has been started, the engine power is transmitted to the rotating electric machine 1 via the crank pulley, belt, and pulley 9. Thus, the rotor 6 is driven to rotate, a three-phase AC having been generated at the armature winding 7a is converted to DC with the control board 18, and the battery 23 is charged.

Figure 3:
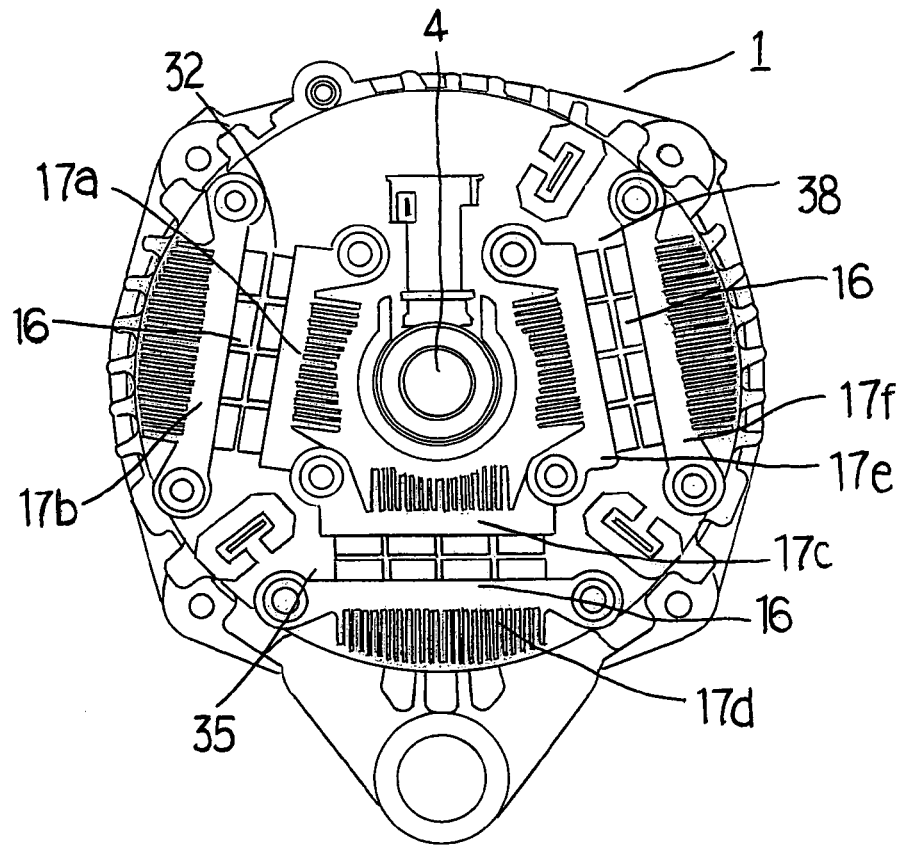
FIG. 3 is a sectional elevation view taken along the line A-A of FIG. 1.

FIG. 3 is a sectional view taken along the line A-A of FIG. 1. An upper arm 31 of U-phase shown in FIG. 2 is attached to an inner heat sink 17a of U-phase 32 of FIG. 3, and a lower arm 33 of U-phase is attached to an outer heat sink 17b of U-phase 32. Likewise, an upper arm 34 of V-phase is attached to an inner heat sink 17c of V-phase 35, as well as a lower arm 36 of V-phase is attached to an outer heat sink 17d of V-phase 35. Furthermore, an upper arm 37 of W-phase is attached to an inner heat sink 17e of W-phase 38, as well as a lower arm 39 of W-phase is attached to an outer heat sink 17f of W-phase 38.

Figure 4:
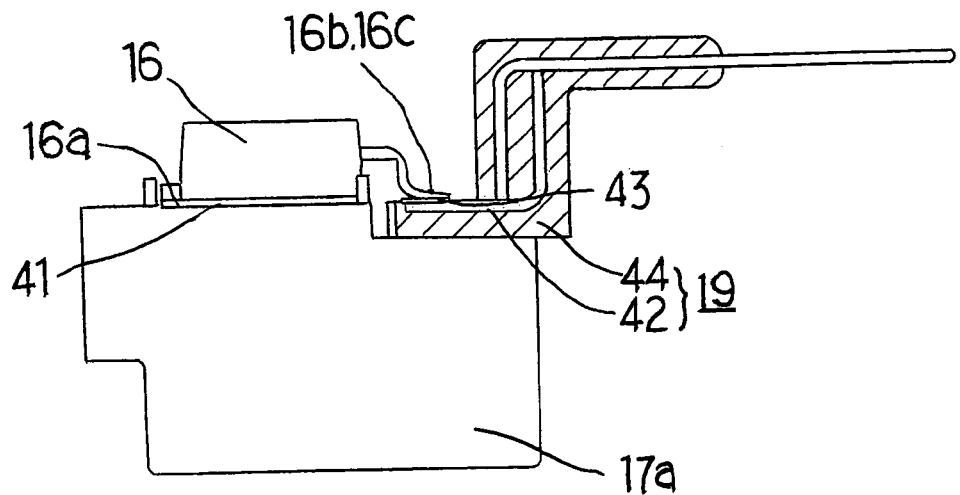
FIG. 4 is a side view showing an arm portion of the rotating electric machine according to the first embodiment of the invention.

FIG. 4 is a side view showing the upper arm 31 of U-phase, and the other arms are constructed in the same manner. The switching element 16 means a single switching element made by one IGBT (insulating gate bipolar transistor) or one MOSFET (field effect transistor) being covered with resin, and further formed into a plate. For example, in the case where the switching element 16 is made of MOSFET, the switching element 16 is provided with a drain electrode terminal 16a in which a plane for dissipating heat is a main terminal, a source electrode terminal 16b, and a gate electrode terminal 16c as a control electrode terminal.

In this case, the drain electrode terminal 16a is a planar base part, and the source electrode terminal 16b and the gate electrode terminal 16c are lead terminals having a polarity different from that of the base part. The drain electrode terminal 16a is directly joined to the heat sink 17a with a solder 41. The heat sink 17a is made of copper, aluminum and the like having heat dissipation and conductivity.

In the case where there are provided fins at the heat sink 17a, heat generated at the switching element 16 can be efficiently dissipated. As the connection member 19, there is formed a metal pattern 42 made of metal having high conductivity such as copper, and the source electrode terminal 16b and the gate electrode terminal 16c are joined to the metal pattern 42 via a solder 43.

In the connection member 19, there is integrally molded a metal pattern 42 including not less than two connection terminals with a resin 44. For example, this integral structure may be formed by injection molding of plastics such as PBT (polybutylene terephthalate), PPS (polyphenylene sulfide), polypropylene, polystyrene, and polyether ketone, or may be formed by transfer molding of a thermosetting resin such as epoxy.

Furthermore, in the connection member 19, a land, being a contact part between leads of the source electrode terminal 16b and gate electrode terminal 16c, and a connection terminal is molded integrally with a metal pattern 61. Further, the leads of the source electrode terminal 16b and gate electrode terminal 16c are joined to the metal pattern 42, and the metal pattern 42 can also function as a bus bar. Making use of space efficiently, it comes to be possible to downsize the device.

The heat sink 17a and the metal pattern 42 are disposed substantially in parallel. BY transferring heat generated at the source electrode terminal 16b to the heat sink 17a, it is possible to improve heat dissipation. Moreover, the drain electrode terminal 16a, the source electrode terminal 16b and the gate electrode terminal 16c are located to be substantially flush with each other. That is, the surface of the heat sink 17a, to which the drain electrode terminal 16a is directly joined, and the top of the metal pattern 42 are located so as to be in the same plane. Therefore, even if they are vibrated in the vertical direction, they are hard to come off.

It is preferable that the source electrode terminal 16b and the gate electrode terminal 16c of the switching element 16 are formed in L-shape, or formed linearly. Additionally, the drain electrode terminal 16a is more susceptible to heat generation from the switching elements 16, and is likely to be in the higher-temperature state than on the side of the source electrode terminal 16b and the gate electrode terminal 16c. Thus, it is preferable that the solder 41 is constructed of a solder material having higher melting point than that of the solder 43.

In the case where the switching element 16 generates heat under high-temperature conditions, the solder 41 is likely to be softened in the vicinity of the melting point, and a solder crack may be generated at the time of vibration Accordingly, by using a solder material having a high melting point as the solder 41, it is possible to improve reliability under the high-temperature conditions.

In addition, at the time of joining together the source electrode terminal 16b and gate electrode terminal 16c of the switching element 16 and the metal pattern 42, it is preferable to join both by welding instead of the solder 43. As the welding, any method that can fuse both materials such as YAG (yttrium, aluminum, garnet) laser or CO2 laser can be used. Welding is a metallic bond of members to each other, and thus the weld provides a higher strength than solder.

Moreover, the source electrode terminal 16b and the gate electrode terminal 16c are made of the same material as that of the metal pattern 42, and thus no difference occurs in linear expansion under low-temperature conditions, thereby enabling to ensure reliability of the device. Furthermore, the welded portion provides higher strength, and further higher resistance against vibration under the high-temperature conditions.

Accordingly, the solder 41 is used between the drain terminal 16a and the heat sink 17a where heat dissipation is required, and the weld is used in joining between the source electrode terminal 16b and gate electrode terminal 16c and the metal pattern 42 where resistance against vibration is required, whereby it is possible to ensure high reliability, high heat dissipation, and high vibration resistance.

Now, a manufacturing method of the structure shown in FIG. 4 is described.

The drain electrode terminal 16a is joined via the solder 41 to the heat sink 17a, and thereafter the source electrode terminal 16b and the gate electrode terminal 16c are joined via the solder 43 to the metal pattern 42. Such joining works with solders are done using a heater heating apparatus, a hot air heater, a high-frequency heater, and the like.

In addition, it is preferable to execute the joining work after the other parts have been assembled. For example, in the preceding process, the drain electrode terminal 16a of the switching element 16 is preferably joined via the solder 41 to the heat sink 17a.

The switching element 16 and the heat sink 17a having been joined with the solder 41 in the preceding process is now assembled to the connection member 19 including the metal pattern 42 to which the solder 43 is applied.

Then, in the subsequent process, the source electrode terminal 16b and gate electrode terminal of the switching element 16 are joined via the solder 43 to the metal pattern 42 of the connection member 19. It is preferable to make the above-mentioned joining in the reverse order. That is, the source electrode terminal 16b and the gate electrode terminal 16c are joined to the metal pattern 42 in the preceding process, and then the drain electrode terminal 16a is joined to the heat sink 17a in the subsequent process.

Now, the method of making connection works by soldering synchronously is described.

First, the connection member 19 is assembled to the heat sink 17a. Then, the solder 41 is applied to the heat sink 17a. Examples of solders 41 include a paste-like solder with which flux is mixed, and a sheet-type solid solder onto which a liquid flux is applied. Furthermore, the solder 43 is applied in positions corresponding to respective electrodes on the metal pattern 42. Examples of solders 43 include a paste solder.

Examples of feeding a paste solder include the method of applying it with a dispenser, or the solder printing method of applying it with a squeegee via a mask.

In addition, it is preferable that a solder is applied before the connection member 19 is assembled to the heat sink 17a. Subsequently, the switching element 16 is mounted on a predetermined position.

There is provided at the heat sink 17a a frame for positioning, so that it is possible to mount the switching element 16 on a predetermined position. Solder joining work can be made in a reflow furnace using a hot air forced to circulate by convection in the vertical direction. The metal pattern 42 and the contact surface of the heat sink 17a with the switching element 16 are located to be substantially in the same plane, and further the contact area between the heat sink 17a and the connection member 19 is large, so that heat is transferred from the heat sink 17a to the connection member 19 at the time of solder joining work. Thus, it is possible to make solder joining at the same time.

Furthermore, instead of using the solder 43, it is preferable to make joining with a weld. Moreover, it is preferable that the melting point of the solder 41 is set to be higher than the melting point of the solder 43.

In the meantime, when solders are fused, there are some cases where the solder 41 applied to the drain electrode terminal 16a of the switching element 16, and the solder 43 applied to the source electrode terminal 16b and the gate electrode terminal 16c, are displaced in complicated directions due to surface tension.

In particular, the distance between the source electrode terminal 16b and gate electrode terminal 16c of the switching element 16 is small, so that the source electrode terminal 16b and the gate electrode terminal 16c may be joined by soldering onto the same metal pattern 42 due to a subtle displacement of the switching element 16. Thus, the short circuit between the electrodes is liable to occur.

To prevent this, in the preceding process, the source electrode terminal 16b and gate electrode terminal 16c of the switching element 16 have preliminarily been joined to the metal pattern 42 via the solder 43.

In this case, by using a jig for positioning of the switching element 16, it is possible to make positioning with accuracy. Thus, the switching element 16 and the connection member 19 having been joined together by soldering in the preceding process are assembled to the heat sink 17a to which the solder 41 is applied. Thereafter, the drain electrode terminal 16a of the switching element 16 and the heat sink 17a are joined together via the solder 41.

As described above, the switching element 16 has been positioned with accuracy in the preceding process, so that it is possible to reliably prevent the occurrence of a short circuit between the electrodes due to the displacement of the switching element 16.

Also in this case, it is preferable that the melting point of the solder 41 is set to be higher than the melting point of the solder 43. Furthermore, it is preferable to make joining with a weld instead of using the solder 43.

Due to such construction, the base surface of the switching element 16 is joined to the heat sink 17, as well as the lead terminals 16b and 16c of the switching element 16 are joined to the connection member 19 with no insulating sheet interposed, so that it is possible to downsize the device, as well as to achieve low costs. In addition, there is no bond structure of an insulating layer, so that the insulting layer never comes off, resulting in improvement in reliability.

Embodiment 2

Figure 5:
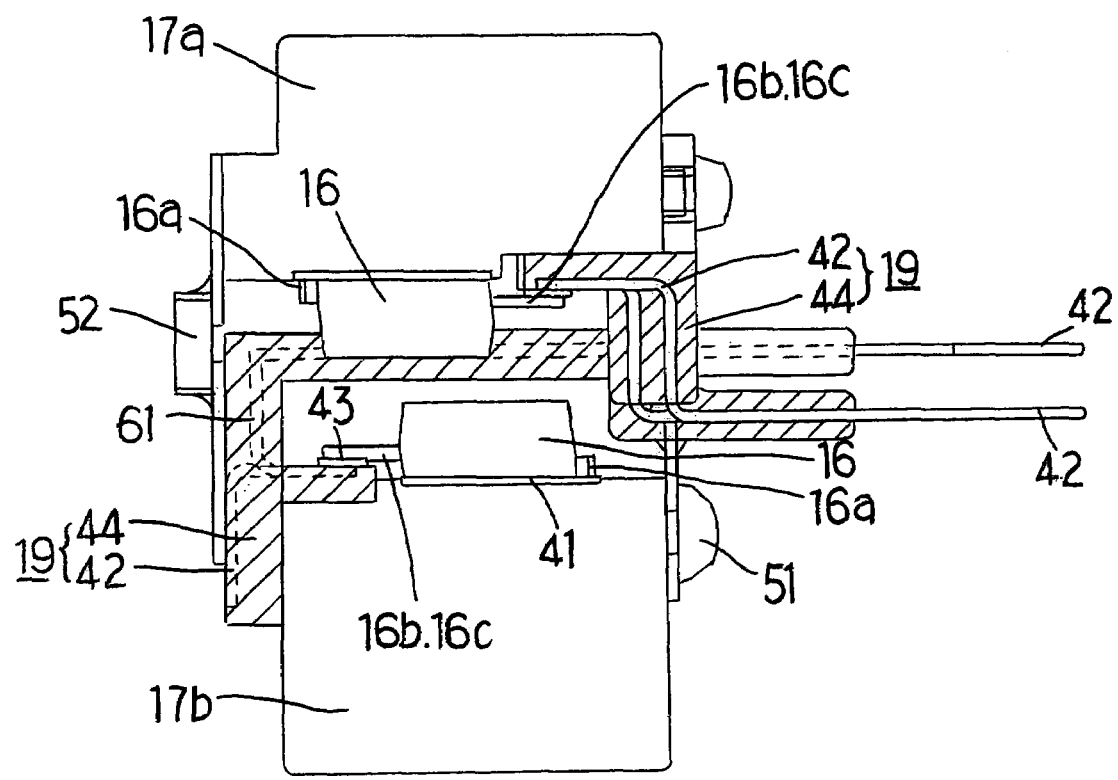
FIG. 5 is a side view showing an assembly structure of an upper arm and a lower arm of the rotating electric machine according to a second embodiment of the invention.

FIG. 5 is a side view showing a state that a lower arm 33 and upper arm 31 of U-phase are assembled.

The lower arm 33 and the upper arm 31 are assembled in the state that the switching elements 16 are opposed. A metal pattern 42 to which a source electrode terminal 16*b* of the upper arm 31 is joined is extended to a heat sink 17*b* of the lower arm 33, and the metal pattern 42 is fixed to the heat sink 17*b* with a screw 51.

Owing to such construction, the drain electrode terminal 16*a* of the lower arm 33 and the source electrode terminal 16*b* of the upper arm 31 are electrically connected. Thus, the switching element 16 of the upper arm 31 and the switching element 16 of the lower arm 33 comes to be connected in series.

Furthermore, to suppress the variation of the DC power source, and to smooth, e.g., the rise of voltage, a smoothing capacitor 52 is used. The smoothing capacitor 52 is joined at the portion exposed outside a resin covering a metal pattern 42 for joining the heat sink 17*b* of the lower arm 33 and the source electrode terminal 16*b* of the upper arm 31 together. Due to this construction, it is possible to downsize the entire device, as well as to reduce the number of parts.

Moreover, at the connection member 19 of each arm, the source electrode terminals 16*b* and gate electrode terminals 16*c* of a plurality of switching elements 16 are joined to the metal pattern 42, and the metal patterns 42 functioning as electrode terminals are integrated with the resin 44, to be drawn out in the same direction and exposed outside the heat sinks 17*a* and 17*b* as a pair of output terminals. In this manner, it is possible that the entire device is downsized, as well as that magnetic fields are counteracted with each other at a pair of metal patterns 42. Accordingly, it is possible to decrease effects of the magnetic fields on the parts located at the peripheral portion.

In addition, the connection member 19 of the upper arm 31 can be disposed just above the heat sink 17*b* of the lower arm 33, as well as the connection member 19 of the lower arm 33 can be disposed just below the heat sink 17*a* of the upper arm 31. That is, the connection members 19 can be contained between the upper arm 31 and the lower arm 33, and need not to be located outside. Consequently, it is possible to effectively utilize the space between the upper arm 31 and the lower arm 33, and thus to achieve downsizing of the device.

Since the connection members 19 are disposed three dimensionally with the space between the upper arm 31 and the lower arm 33 utilized, it is possible to reduce the area of wiring, as well as to make wiring so as to fill the gap between respective switching elements 16 of the upper arm 31 and the lower arm 33. Thus, it is possible to achieve downsizing of the device.

Embodiment 3

Figure 6:
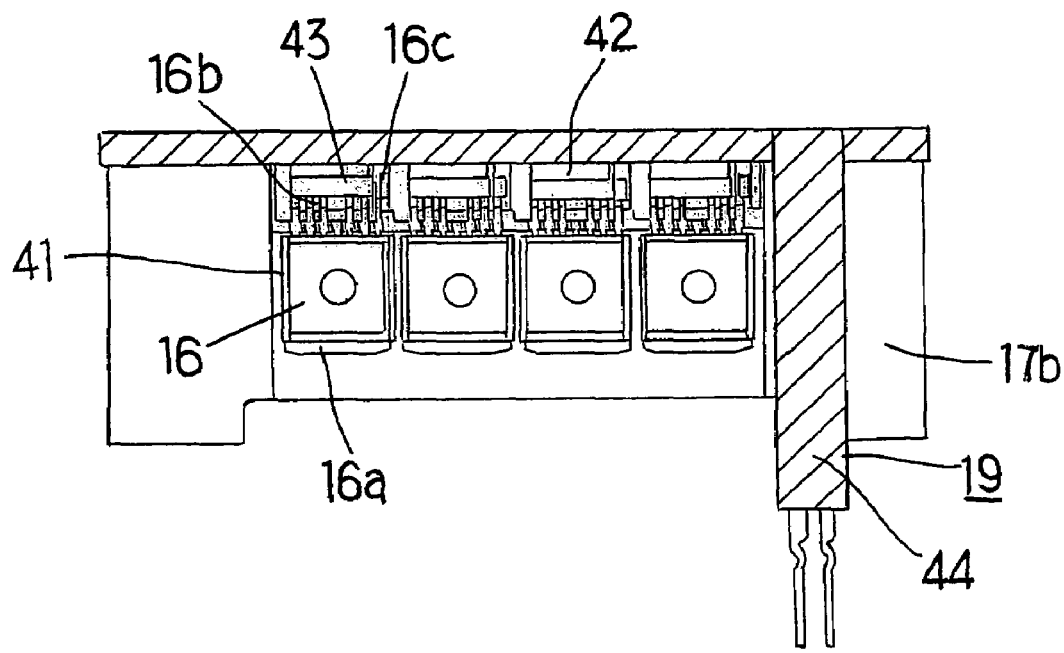
FIG. 6 is a plan view showing an arm portion of the rotating electric machine according to a third embodiment of the invention.

FIG. 6 is a plan view showing a lower arm portion of U-phase. With reference to the drawing, drain electrode terminals 16*a* of a plurality of switching elements 16 are joined to the same heat sink 17*b* with solders 41. Source electrode terminals 16*b* and gate electrode terminals 16*c* are joined to respective metal patterns 42 with solders 43. In this manner, a plurality of switching elements 16 are joined to one connection member 19 in the state of being close to each other, so that they can be connected to the control board 18 via one output terminal. Consequently, it is possible to be unaffected by noises, and further to downsize the entire device.

Embodiment 4

Figure 7:
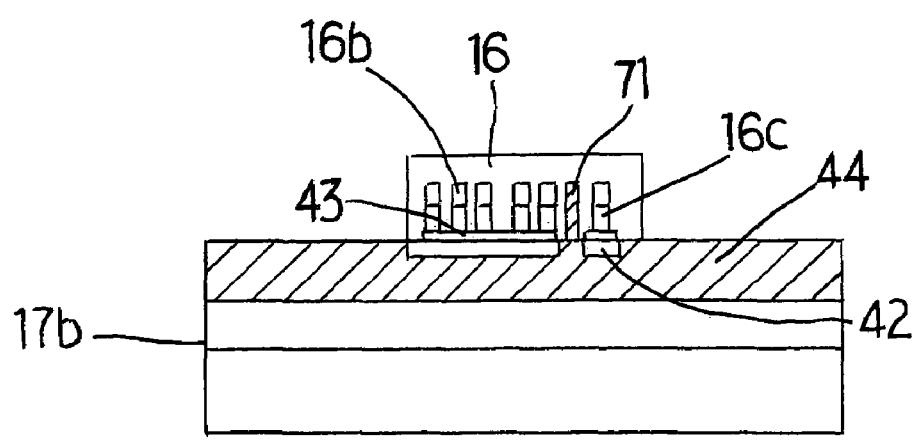
FIG. 7 is a rear sectional view showing an arm portion of the rotating electric machine according to a fourth embodiment of the invention.

FIG. 7 is a rear sectional view showing a lower arm portion of U-phase. There is provided between a source electrode terminal 16*b* and a gate electrode terminal 16*c* of the switching element 16 a partition wall 71 forming a part of a resin 44. Due to provision of the partition wall 71 like this, at the source electrode terminal 16*b* and gate electrode terminal 16*c* of the switching element 16, when the solders 43 are fused, it is possible to suppress occurrence of a solder bridge between both electrodes, as well as to prevent the short circuit between both electrodes. Furthermore, with the partition wall 71, it is possible to easily position the switching element 16. The above-mentioned construction is particularly effective in the case of shortening the distance between the electrodes in order to downsize the entire device.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rotating electric machine comprising:
   a rotor that is fixed to a shaft, and includes a field winding;
   a stator that is disposed opposite to said rotor, and includes an armature winding; and
   a control device for controlling current flowing through said armature winding;
   wherein said control device is formed of switching elements and heat sinks to which said switching elements are joined;
   said switching elements each include a planar base part and lead terminal having a polarity different from that of said base part;
   said base part is directly and electrically joined to one of said heat sinks, and said lead terminals are joined to a metal pattern formed at a connection member; and
   a surface of said one heat sink, to which said base part is directly joined, and a top of said metal pattern are constructed to be substantially in the same plane.

2. The rotating electric machine according to claim 1, wherein two said switching elements are disposed in opposition, said connection members are disposed in a space between said two elements, and further said connection members are drawn out in the same direction.

3. The rotating electric machine according to claim 1, wherein a plurality of said switching elements are joined to one heat sink and one connection member.

4. The rotating electric machine according to claim 1, further comprising a partition wall dividing said lead terminals.

5. The rotating electric machine according to claim 1, wherein said lead terminals and said metal pattern are made of the same material.

6. The rotating electric machine according to claim 1, wherein said base part is a drain of a MOSFET, and said lead terminals are the source and gate of the MOSFET.

7. A method of manufacturing a rotating electric machine, comprising a rotor that is fixed to a shaft, and includes a field winding; a stator that is disposed opposite to said rotor, and includes an armature winding; and a control device for controlling current flowing through said armature winding; wherein said control device is formed of switching elements and heat sinks to which said switching elements are joined; said switching elements each include a planar base part and lead terminals having a polarity different from that of said base part; said base part is directly and electrically joined to one of said heat sinks, and said lead terminals are joined to a metal pattern formed at a connection member; and a surface of said one heat sink, to which said base part is directly joined, and a top of said metal pattern are constructed to be substantially in the same plane, said method comprising the steps of:
assembling said connection member to said heat sink;
joining said lead terminals to said metal pattern; and
joining said base part to said heat sink.

8. A method of manufacturing a rotating electric machine, comprising a rotor that is fixed to a shaft, and includes a field winding; a stator that is disposed opposite to said rotor, and includes an armature winding; and a control device for controlling current flowing through said armature winding; wherein said control device is formed of switching elements and heat sinks to which said switching elements are joined; said switching elements each include a planar base part and lead terminals having a polarity different from that of said base part; said base part is directly and electrically joined to one of said heat sinks, and said lead terminals are joined to a metal pattern formed at a connection member; and a surface of said one heat sink to which said base part is directly joined, and a top of said metal pattern are constructed to be substantially in the same plane, said method comprising the steps of:
joining said lead terminals to said metal pattern; and
assembling said switching element to said heat sink; and
joining said base part to said heat sink.

* * * * *